July 31, 1945.     H. M. McDONALD     2,380,771
APPARATUS FOR FILLING CONTAINERS WITH MILK AND OTHER LIQUIDS
Filed Oct. 15, 1941     2 Sheets-Sheet 1

INVENTOR
HECTOR M. MC DONALD
BY Glascock, Downing & Seebold
ATTORNEYS.

July 31, 1945.   H. M. McDONALD   2,380,771
APPARATUS FOR FILLING CONTAINERS WITH MILK AND OTHER LIQUIDS
Filed Oct. 15, 1941   2 Sheets-Sheet 2

INVENTOR
HECTOR M. McDONALD
BY Glascock Downing & Seebold
ATTORNEYS.

Patented July 31, 1945

2,380,771

UNITED STATES PATENT OFFICE 2,380,771

APPARATUS FOR FILLING CONTAINERS WITH MILK AND OTHER LIQUIDS

Hector Murdoch McDonald, Meeniyan, Gippsland, Victoria, Australia

Application October 15, 1941, Serial No. 415,124
In Australia October 24, 1940

2 Claims. (Cl. 226—116)

This invention relates to improvements in and connected with apparatus for filling containers with milk and other liquids and refers especially, but is not limited, to apparatus for use with milking machines wherein the milk is drawn from cows and delivered to a receptacle and thence to a plurality of milk cans or like containers under the influence of a vacuum.

Hitherto, it has been proposed to direct the milk from the cows to a collecting receptacle under vacuum and to connect the receptacle to closed containers, such as milk cans, in series by a number of separate pipes whereby the milk will be induced to flow into the containers by the vacuum maintained in the system.

The disadvantages experienced with filling apparatus of the above type are that the milk is subjected to a substantial turbulence with the result that particles of butter are formed in the milk, the milk is not effectually deodorised, it cannot be delivered into a large number of containers without adversely affecting the control of the vacuum and the milk delivered into the different containers will not contain a uniform quantity of butterfat owing to a portion of the cream rising in the milk in the first container passing on with the milk to the other cans.

The object of the present invention is to provide simple and economically constructed means which will enable cans and other containers to be easily and quickly filled to a predetermined height with milk and other liquids and which when used with a vacuum controlled milking machine will enable the milk to be delivered to any desired number of cans in a manner that will ensure it being effectually deodorised and passed in a more or less quiescent state from the receptacle to a number of containers while maintaining a uniform grade of milk in all the containers.

Briefly, the invention as applied to vacuum controlled milking machines having a closed milk storage receptacle arranged in communication with a vacuum pump and the milk and vacuum pipes leading to the teat cups consists of an outlet from the closed receptacle communicating with a milk distributing pipe formed of detachably connected sections of substantial diameter and having depending branches entering a corresponding number of milk cans, a vacuum return pipe for placing the outer end of the distributing pipe in communication with the vacuum pump, and a backlash eliminating device interposed between the storage receptacle and the vacuum pump constructed and arranged whereby the air displaced from the cans during the filling operation will pass upwardly through the branches in contact with and in opposition to the milk flowing into the cans and then through the distributing pipe, in the same direction as the flow of the milk to the vacuum return pipe.

In a modification of the invention, a pipe for supplying milk or other liquid to be delivered to the containers can be connected direct to the distributing pipe and the vacuum return pipe can be coupled to a backlash eliminating device which is connected to the vacuum pump and the air pipe line of the milking machine.

The invention in its simplest form is adapted for filling cans and other containers to a desired height with milk or other liquid by gravity from a suitable source of supply and without the aid of a vacuum as when the removal of odours is not required.

In order that the invention, the object and nature of which have been set forth, may be readily understood, reference will now be had to the accompanying sheets of explanatory drawings wherein.

Figure 1:
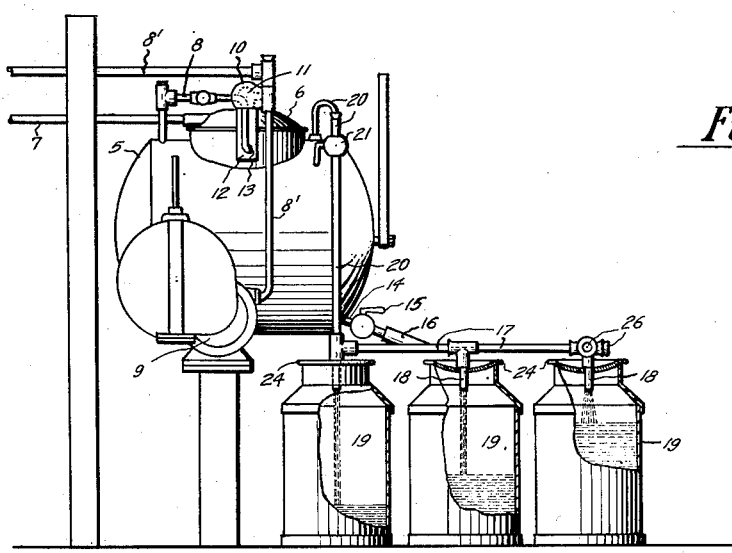
Figure 1 is a view in elevation showing the invention applied to a milk receiving receptacle and vacuum producing apparatus of a vacuum milking machine.

In these drawings, like characters of reference are employed to indicate the same or corresponding parts in the different views and the numeral 5 designates a milk storage receptacle of substantial size having an opening in the top thereof provided with a removable cover 6 of approved type which is adapted to effectually exclude air from the receptacle when a partial vacuum is produced therein.

A milk pipe 7 passes from the teat cups (not shown) to the top of the cover 6 and when a cooler is located in the receptacle, the milk in gravitating in a thin film thereover is effectually deodorised and reduced in temperature at this point.

The top of the receptacle is connected by a pipe 8 to an air pipe 8¹ which places the teat cups in communication with a vacuum pump 9 and in a horizontal portion of this pipe 8 is fitted a backlash eliminating device 10 comprising a cover 11 and a detachable bowl 12 of glass or other material into which one end of the pipe connected to the receptacle depends and is fitted with a non-return valve 13 of approved construction.

The non-return valve 13 on the end of the portion of the pipe 8 depending into the bowl 12 of the backlash device is of the flap type and is retained on its seat by gravity.

An outlet pipe 14 fitted with a cock 15 is fitted to the bottom of the receptacle 5 and is connected by a flexible piece of tubing 16 to a distributing pipe 17 having a number of depending branches 18 passing into a corresponding number of milk cans 19 arranged in juxtaposition to each other. The end of the distributing pipe remote from the receptacle is arranged in communication by means of a return pipe 20 with the top of the receptacle as shown.

Figure 5:
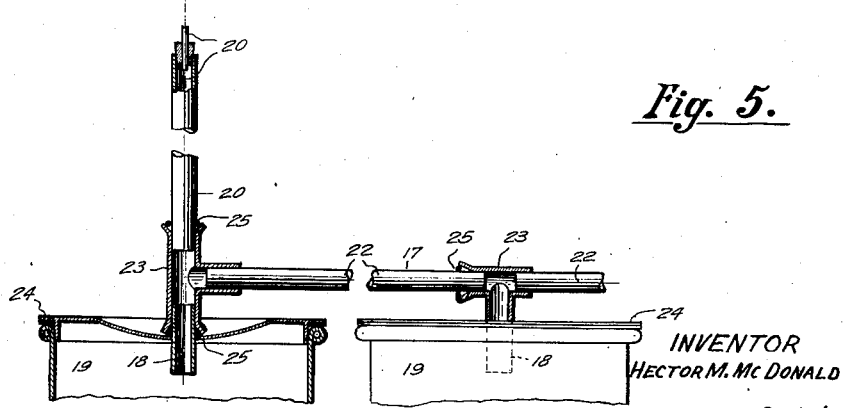
Figure 5 is a view in elevation partly in section of part of the milk distributing and vacuum return pipes and shows the manner of connecting the distributing pipe to the containers.

The vacuum return pipe 20 is provided with a cock 21 of approved design. The pipe 17 for distributing the milk from the vat to the cans 19 is of substantial diameter and preferably is made of a plurality of detachable sections having angularly disposed T pieces on one of their ends whereby any number of sections may be used to suit the number and arrangement of cans to be filled, see Fig. 5.

Each section of the distributing pipe consists of a horizontal portion 22 having one of its ends fitted into a horizontal socket of a T-piece 23 into the depending socket of which is fitted with a short branch pipe 18 adapted to pass through a hole in the lid 24 of a can whilst the opposite horizontal socket is adapted to receive the free end of the horizontal portion 22 of a similar section of distributing pipe.

The pipe 18 depending from the vertical branch of the T-piece 23 projects into the milk can to a sufficient depth to determine the point to which the cans are to be filled and a sealing ring 25 (see Fig. 5) of rubber is provided on the branch 18 for effectually excluding air from the can when the milk is being delivered thereto. Alternatively, the pipes 18 can be secured to the lids 24 and the depending bosses on the T-pieces 23 can be detachably secured thereto in any approved way. When the branch pipes are fitted to the lids 24 they can be provided with taps (not shown) which may be closed and the distributing pipe removed when the cans are filled so that a partial vacuum can be retained in the can and the milk delivered to hospitals and other places without permitting the atmosphere to come into contact with the milk.

Figure 2:
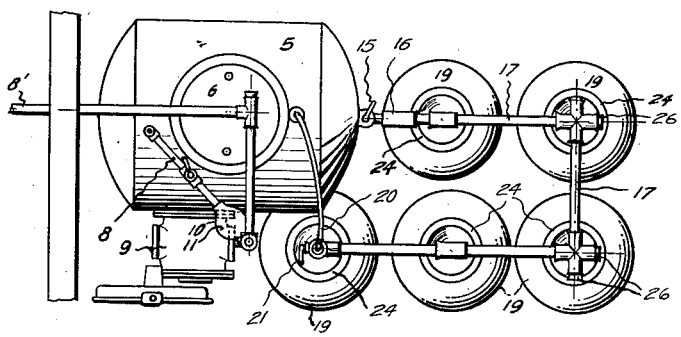
Figure 2 is a view in plan of Figure 1.
Figure 3:
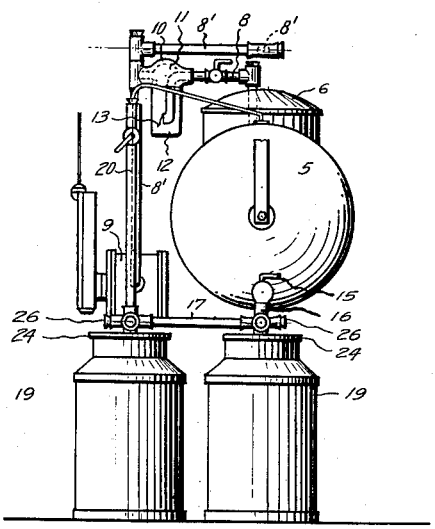
Figure 3 is a view in end elevation of Figure 1.

The free ends of some of the horizontal sections 22 of the distributing pipe may be provided with two or more radially disposed sockets whereby the sections may be assembled to suit any arrangement of milk cans and the open ends of the branches not in use can be closed by rubber plugs 26 or the like, see Fig. 2.

The ends of the sockets accommodating the free ends of the sections 22 of the distributing pipe are flared and sealing rings 25 of rubber slipped over the pipe are placed against the sockets to effectually prevent the ingress of air thereto and similar sealing devices may be employed with all "slip-in" connections between the parts of the apparatus.

In operation, the milk passes from the receptacle 5 to the distributing pipe 17 supported above all of the milk cans and as the sections 22 of the distributing pipe 17 are connected to and arranged in communication with the vacuum system, the milk will flow continuously to and fill all of the cans in succession and without creating any turbulence or agitation in the milk. The milk will flow freely through the distributing pipe 17 and branches 18 in such a way that the cans will be filled progressively, that is to say, the greater amount of the milk will flow into the first can and at the same time in progressively decreasing quantities into the succeeding cans until each can is filled. The air displaced from the cans during the filling operation passes upwardly through the branches 18 in opposition to the flow of milk and through the distributing pipe, in the same direction as the milk, to the return pipe 20.

When each can has been filled with milk to the level of the branch pipe 18 depending therein, the partial vacuum will be cut off from the can and the milk will continue to rise above the lower end of the branch pipe until the air pressure in the can equals the gravity pressure of the milk within the branch pipe. The balancing of the air and gravity pressures results in the cessation of the flow of milk to the filled can and ensures the milk therein remaining in a quiescent state. Moreover, the whole of the milk passing from the receptacle 5 flows direct to the remaining cans without disturbing the milk in the filled cans or in any way influencing the butterfat content therein.

When all of the cans have been filled or the filling operation has been completed, the tap 15 in the discharge pipe passing from the receptacle and the tap 21 in the vacuum return pipe 20 passing from the cans are turned off and the lids are removed from the cans and replaced by ordinary lids.

When the lids 24 are fitted with branch pipes 18 having taps therein the taps are closed after the cans are filled and before the distributing pipe is removed from the branch pipes. The filled cans are thereby sealed under vacuum and they can be replaced by another set of cans.

The purpose of the "backlash" eliminating device 10 is to prevent atmosphere laden with oily or other vapors passing from the pump or from the air pipe to the milking system.

The term "backlash" is intended to mean the action which takes place upon the frequent periods of instantaneous equalisation of atmospheric pressure between the milk and air pipe lines due to the operation of a pulsator (not shown) and which if not arrested causes the return to the milk, of unwanted feed and other odors already drawn off with oily and other deteriorating vapors which are associated with mechanically operated milking machines.

Thus when the machine is in operation the valve 13 in the backlash eliminating device will remain open during the periods when a partial vacuum is produced within the milk bowl 12 and air pipe line 8¹ and will close automatically to isolate the milk system from the air pipe line and pump when the partial vacuum is destroyed in the air pipe line by the action of the pulsator. The backlash eliminating device will also serve to isolate the milk system from the atmosphere and pump should the pump break down or an air leak occur in the air pipe line.

The bowl of the backlash eliminating device also serves to entrap any moisture which may pass thereto from the air pipe 8¹.

The exclusion of air during the filling process makes possible a milk that is free from air pockets and the contributory contaminating effect of bacteria—inevitably introduced into the milk thereby, and minimises sponginess, blowing and gassing.

Figure 4:
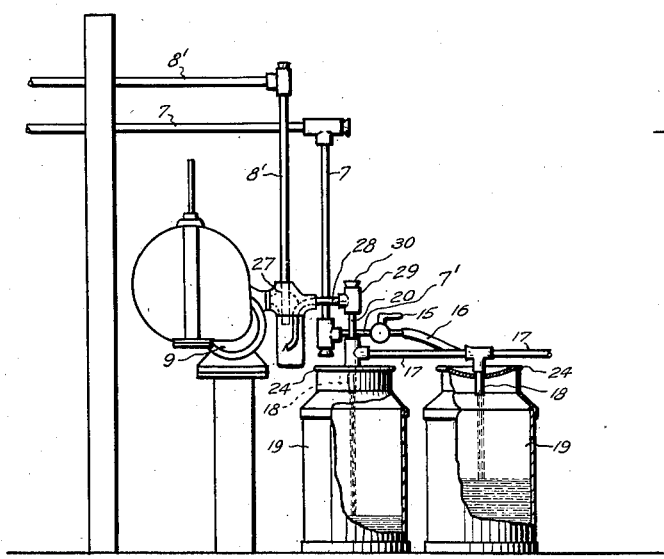
Figure 4 is a view in elevation of a modified form of the invention.

In adapting the invention to a vacuum milking machine which is not provided with a storage receptacle, the milk pipe 7 can be coupled direct to the upper end of the distributing pipe and the vacuum return pipe 20 can be connected to a backlash eliminating device 27 (similar to 10) which is arranged in communication with the vacuum pump and the air pipe line 8¹, as shown in Figure 4.

In Figure 4 the numeral 7¹ indicates the portion of the milk pipe which passes to the distributing pipe 17 and in this instance a tap similar to 15 is inserted at an approved point in the length of the milk pipe. In this view a backlash eliminating device 27 is shown interposed between the vacuum pump and the air pipe line 8 and the numeral 28 indicates the pipe connection between the backlash eliminating device 27 and the vacuum return pipe 20. In this instance the connecting pipe 28 is shown coupled to the return pipe 20 by a T-piece 29 and the upper branch of the T-piece is closed by a removable plug 30 which can be easily removed to facilitate cleaning operations. The end of the pipe 28 depending within the backlash eliminating device 27 is fitted with a gravity valve which will close automatically when the vacuum pump is rendered inoperative.

In this adaptation of the invention, the milk passes direct from the milk pipe 7 to the distributing pipe 17 and cans 19 and the milk is at all times under the influence of a vacuum. When the cans have been filled with milk the tap 15 is closed and the distributing pipe is removed as hereinbefore described and replaced on another set of empty cans.

In adapting the invention to the filling of cans and other containers without the use of a vacuum, care must be exercised to provide the containers with airtight lids or closures and the return pipe for the escaping air is taken from the last or lowest receptacle to the top of the supply tank or to a point level therewith, when a supply tank is used.

In this adaptation of the invention the distributing pipe and cans or other receptacles are arranged so that the milk will gravitate freely through the former to the latter. The sockets on the ends of the sections of the distributing pipes are arranged so that the sections can be disposed to suit the disposition of the cans or other containers.

If preferred, the return pipe can be fitted with a glass tube to indicate when all of the cans or containers are filled.

The invention is exceedingly simple in construction and operation, and in use will be found thoroughly efficient for the purpose for which it has been devised.

I claim:

1. An apparatus for filling a series of containers having air-tight closures thereon with milk under a partial vacuum from a source of supply comprising a distributing pipe of substantial diameter adapted to be supported above all of the containers and connected at one end to the source of supply, a branch pipe depending from the distributing pipe above each container and adapted to pass through the closure thereon, a vacuum pump, a covered bowl, a pipe connecting the vacuum pump to the cover on the bowl, a pipe having one end passing through the cover and depending within the bowl and its opposite end connected to the end of the distributing pipe remote from the source of supply, and a non-return valve on the end of the pipe depending within the bowl.

2. An apparatus for filling a series of containers having air-tight closures thereon with milk under a partial vacuum from a source of supply comprising a closed storage receptacle for the supply of milk, a distributing pipe of substantial size connected at one end to the lower part of the storage receptacle, a branch pipe depending from the distributing pipe above each container to be filled and passing through the closure thereon, a pipe connecting the end of the distributing pipe remote from the storage receptacle to the upper part of the said receptacle, a vacuum pump, a covered bowl, a pipe connecting the vacuum pump to the cover on the bowl, a pipe having one end passing through the cover on and depending within the bowl and its opposite end connected to the upper part of the storage receptacle, and a non-return valve on the end of the pipe depending within the bowl.

HECTOR MURDOCH McDONALD.